(No Model.)

W. H. CLARK.
BICYCLE TIRE CLEANER.

No. 572,355.                    Patented Dec. 1, 1896.

WITNESSES.
Howard E. Barlow
James W. Richardson

INVENTOR.
William H. Clark.
BY Benj. Arnold
ATTORNEY.

UNITED STATES PATENT OFFICE.

WILLIAM H. CLARK, OF PROVIDENCE, RHODE ISLAND.

BICYCLE-TIRE CLEANER.

SPECIFICATION forming part of Letters Patent No. 572,355, dated December 1, 1896.

Application filed August 3, 1896. Serial No. 601,431. (No model.)

*To all whom it may concern:*

Be it known that I, WILLIAM H. CLARK, of Providence, in the county of Providence and State of Rhode Island, have invented certain new and useful Improvements in Bicycle-Tire Cleaners; and I do hereby declare that the following is a full, clear, and exact description thereof, reference being had to the accompanying drawings, and to the letters of reference marked thereon, which form a part of this specification.

This invention is for the purpose of cleaning the tires of bicycles by scraping the dirt off while running and is made adjustable, so as to be capable of being thrown into or out of action, as the condition of the road may require.

It is fully explained and illustrated in this specification and the accompanying drawings.

Figure 6:
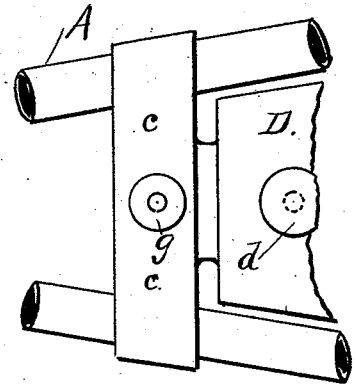
Figure 1:
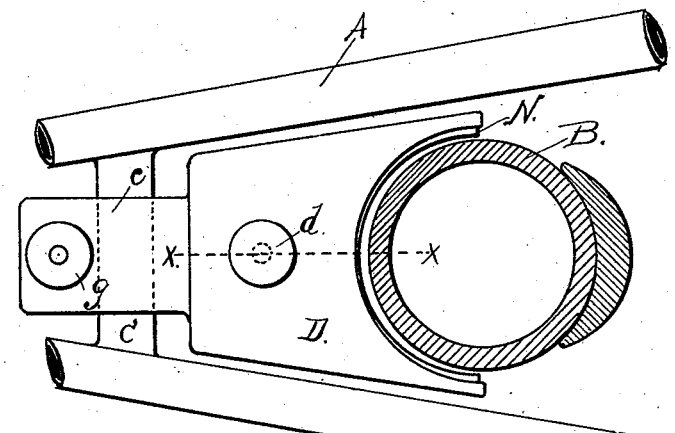
Figure 4:
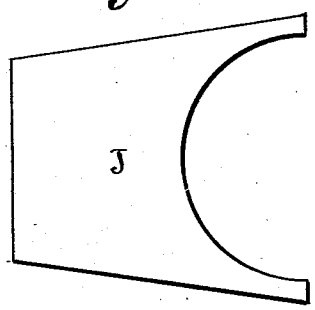
Figure 2:
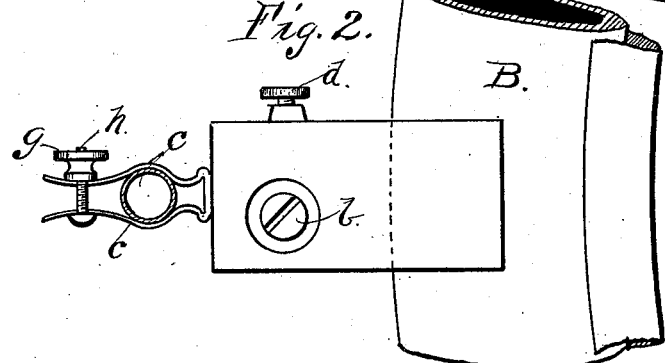
Figure 5:
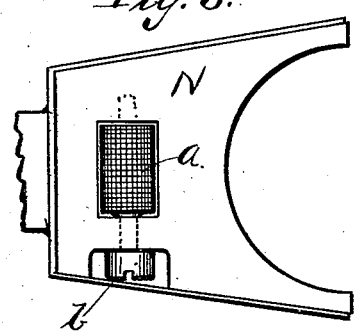
Figure 3:
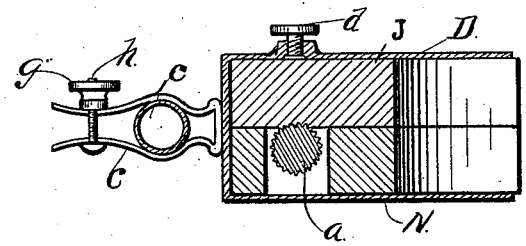

Figure 1 shows the cleaning device attached to the cross-section between the branches of one of the forks of a bicycle with a section of the tire of one of the bicycle-wheels. Fig. 2 is a side elevation of the cleaner with a portion of a wheel-tire. Fig. 3 is a vertical section of the cleaner, taken on line $x$ $x$, Fig. 1. Fig. 4 is a top view of the rubber block that cleans the tire. Fig. 5 is a top view of the block of wood with the upper half of the case and rubber block removed. Fig. 6 shows a modification of the clamp for holding the cleaner on the bicycle.

Its construction is as follows:

A case D is made, preferably of sheet metal for lightness, closed on all sides except at one end, and having top and bottom of the case at the open end cut out in a concave form to conform to the shape of the tire of a wheel, as in Fig. 1. A block of wood N, Fig. 5, of about one-half the thickness of the case D is cut in shape to fit into the case, and a recess is made in its center to receive the roller $a$, which is held in bearings so as to project a little through the top of the block. The surface of the roll $a$ is covered with sharp points and the end of the shaft of the roll has a flattened portion $b$, which projects out of the side of the box, by which the roll can be turned. (See Fig. 2.) A block of rubber or leather or other suitable material $b$ is made of the same shape as the block of wood N to occupy the upper part of the case D, and one end of the two blocks J and N are cut in a concave shape like the case D.

In Fig. 3 it will be seen that the block of wood N occupies the lower part of the case and the block of rubber J lies upon top of it in position to be moved toward the open end of the case D when the roll $a$ is turned in the direction of the arrow. A set-screw $d$ is fitted to screw down through a block secured to the top of the case D and press on the block of rubber J and hold it in any position that it may be set by the turning of the roll $a$. The clamp-plates $c$ $c$ are attached to the rear end of the case D and curved in proper shape to clasp the cross-bar C, Fig. 2, where the cross-bar is seen in section, and a screw-bolt $h$ is put through the two plates $c$ outside of the cross-bar, with screw-nut $g$ fitted on it to draw the two together and to hold the case fast to the cross-bar.

For bicycles having no cross-bars the clamps for holding it may be turned to the sides of the case D, so as to clamp onto the side bars A of the fork. (See Fig. 6.)

The mode of operating the cleaner is to put the case between or on the side bars and clamp it to the cross-bar C of the fork by taking out the screw $h$ and passing the bar in between the plates $c$ $c$, then inserting the screw again and screwing on the nut $g$ until the plates $c$ $c$ clamp the cross-bars C firmly, taking care to set the case so that the tire of the wheel when the block of rubber J is clear in the case will clear the blocks N and J. When it is wanted to clean the mud off of the tire, the screw $d$ is turned out, so as to leave the rubber block free to move, and by turning the roll $a$ by the head $b$ the teeth in the roll will move the rubber block out against the tire lightly, and the screw $d$ is then screwed down on it to hold it in place. Then as the wheel turns the dirt will be scraped off of it by the edges of the rubber block J. By this device the wheel can easily be cleaned of mud, which is oftentimes a great annoyance to the rider and cause of the wheel going hard. The rubber block J can easily be replaced by a new one when it becomes worn by use.

Having thus described my improvements, I claim as my invention and desire to secure by Letters Patent—

In a cleaning device for bicycle-tires, the following combination of instrumentalities; a case or box fitted to go between the bars of the fork and having one end open and shaped to fit the tire, a stationary block placed in the lower part of said case, a shaft held in bearings in said stationary block and carrying a roll having sharp points on its surface, a movable block of rubber or other yielding material placed on said stationary block and in contact with the points on the roll, a screw fitted in the top of the case to screw down on and hold the movable block, with means for clamping said case to the forked bars of the bicycle, substantially as described.

In testimony whereof I have hereunto set my hand this 30th day of July, A. D. 1896.

WILLIAM H. CLARK.

In presence of—
BENJ. ARNOLD,
HOWARD E. BARLOW.